United States Patent [19]
Hofbauer et al.

[11] Patent Number: 5,610,496
[45] Date of Patent: Mar. 11, 1997

[54] DUAL BATTERY CONTROL SYSTEM

[75] Inventors: Thomas Hofbauer, Ronkonkoma; Darren Kropp, East Patchogue, both of N.Y.

[73] Assignee: Symbol Technologies, Inc., Holtsville, N.Y.

[21] Appl. No.: 491,339

[22] Filed: Jun. 30, 1995

[51] Int. Cl.⁶ .................................................. H02J 7/00
[52] U.S. Cl. ................................................ 320/13; 320/15
[58] Field of Search ................................ 320/13, 15, 16, 320/39

[56] References Cited

U.S. PATENT DOCUMENTS

| | | |
|---|---|---|
| 4,017,779 | 4/1977 | McDonald et al. ............... 320/15 |
| 4,691,118 | 9/1987 | Nishimura . |
| 4,709,202 | 11/1987 | Koenck et al. . |
| 4,716,354 | 12/1987 | Hacker . |
| 4,851,756 | 7/1989 | Schaller et al. . |
| 5,168,206 | 12/1992 | Jones . |
| 5,204,610 | 4/1993 | Pierson et al. . |
| 5,307,002 | 4/1994 | Ho et al. . |
| 5,331,580 | 7/1994 | Miller et al. ................. 364/708.1 |
| 5,347,163 | 9/1994 | Yoshimura . |
| 5,387,858 | 2/1995 | Bender et al. ................ 320/15 X |

FOREIGN PATENT DOCUMENTS

553810A1  8/1993  European Pat. Off. .

*Primary Examiner*—Peter S. Wong
*Assistant Examiner*—Patrick B. Law

[57] ABSTRACT

A portable device such as a bar-code reader employing a dual battery control system whereby an auxiliary battery powers the portable device until a primary battery is automatically connected to continue powering the portable device is disclosed. The portable device employs an electrical interface means which operatively connects with an interface means of a holster in which the portable device is placed. The holster comprises some or all of the circuitry necessary to properly control first and second switch means which connect or disconnect the primary and auxiliary batteries from the electronic load of the portable device.

11 Claims, 5 Drawing Sheets

DUAL BATTERY CONTROL SYSTEM

FIELD OF INVENTION

This invention relates to portable systems which require batteries. This invention more particularly relates to portable systems employing primary and auxiliary batteries which are automatically connected to or disconnected from the portable system.

THE PRIOR ART

Portable systems, such as hand held scanners, require the use of a battery to provide power, which is often rechargeable. When the battery requires recharging, the hand held scanner is taken out of service and placed in a recharging cradle. During heavy usage of the scanning unit, frequent recharge cycles are required and therefore undesirable downtime of the scanning unit results.

Complex and costly battery management systems have been developed to improve battery efficiency and limit system downtime. U.S. Pat. No. 5,204,610 discloses a battery management system which is capable of utilizing dual batteries to reduce system downtime. However, the system disclosed in U.S. Pat. No. 5,204,610 teaches a complex battery charger arrangement which is not readily useable in a retrofit application. Similarly, U.S. Pat. No. 5,168,206 discloses a battery management system which is directed to charging a backup battery.

Thus, the prior art does not disclose a simple, inexpensive, dual battery management system which reduces system downtime and lends itself to retrofit applications.

SUMMARY OF THE INVENTION

The battery management system of the present invention provides a simple, cost effective and automatic means to reduce system downtime due to battery recharge cycles. Further, the present invention readily lends itself to retrofit applications.

More specifically, the present invention comprises a portable device (load) which is operatively connected to either an auxiliary battery or a primary battery. When the electromotive force (EMF) of the auxiliary battery is above a predetermined level, the auxiliary battery is operatively connected to the load via a first switch means and the primary battery is disconnected from the load via a second switch means. When the electromotive force (EMF) of the auxiliary battery is below a predetermined level, the auxiliary battery is disconnected from the load via the first switch means and the primary battery is operatively connected to the load via the second switch means.

DESCRIPTION OF THE FIGURES

The invention can be better understood when considered with the following drawing wherein.

DETAILED DESCRIPTION OF THE PREFERRED EMBODIMENT

Figure 1:
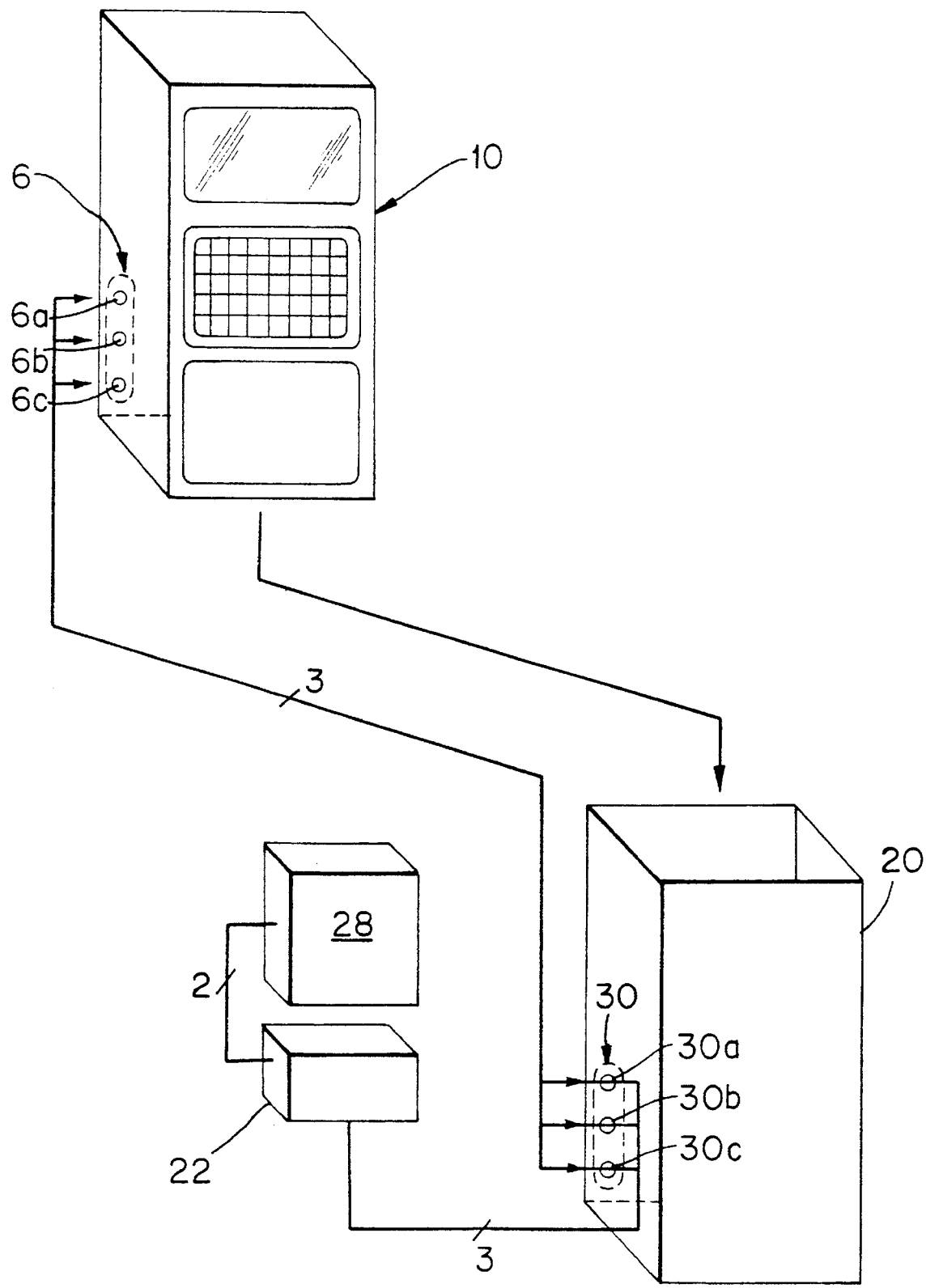
FIG. 1 is a perspective view of the automatic battery control system of the present invention.
Figure 2:
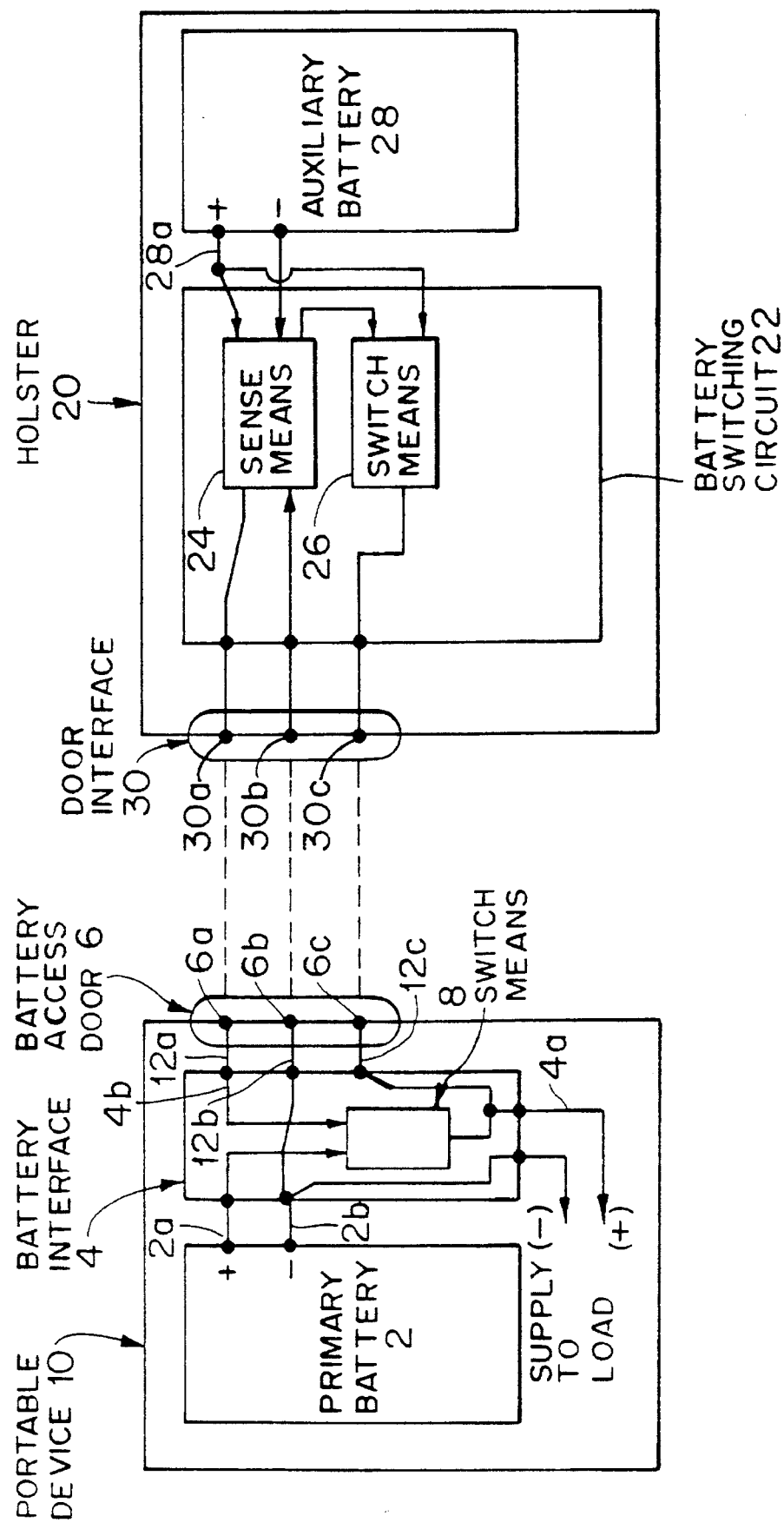
FIG. 2 is a diagram of the automatic battery control system of the present invention.

Reference is now made to FIG. 1 which shows a perspective view of the automatic battery control system of the present invention. As shown, the invention generally comprises a portable device 10 such as a hand held bar-code reader and a holster 20. As best seen in FIG. 2, the portable device 10 generally comprises an electronic load, a primary battery 2 and a battery access door 6. Turning back to FIG. 1, the holster 20 generally comprises an auxiliary battery 28, a battery switching circuit 22 and a door interface 30. The battery access door 6 and the door interface 30 comprise electrical contacts, designated 6a, 6b, 6c, 30a, 30b and 30c respectively, which provide a means for conducting electricity therebetween. Thus, when the portable device 10 is placed in the holster 20, the battery access door 6 operatively connects to the door interface 30 such that electrical contacts 6a, 6b and 6c are connected with electrical contacts 30a, 30b and 30c respectively. Thus, as will be described in greater detail below, the portable device 10 may draw power from the auxiliary battery 28 of the holster 20 or from the primary battery 2 of the portable device 10 according to the control of the battery switching circuit 22.

Reference is now made to FIG. 2 which shows a block diagram of the automatic battery control system of the present invention. Elements of FIG. 2 which are the same as those shown in FIG. 1 have the same reference designations. As shown in FIG. 2, the portable device 10 generally comprises a primary battery 2, a battery interface 4, and a battery access door 6. The battery interface 4 comprises switch means 8 and contacts 12a, 12b and 12c. The holster 20 generally comprises auxiliary battery 28, battery switching circuit 22 and door interface 30. The battery switching circuit 22 comprises sense means 24 and switch means 26.

When the battery access door 6 is placed onto the portable device 10, the contacts 6a, 6b and 6c connect to contacts 12a, 12b and 12c, respectively, of the battery interface 4. Electrical connections are thereby made between the battery switching circuit 22 of the holster 20 and the battery interface 4 of the portable device 10.

A conventional battery interface 4 of the prior art only provides a means for connecting the primary battery contacts 2a and 2b to the electronic load of the portable device 10. However, the battery interface 4 of the present invention also provides a means for disconnecting the primary battery contact 2a from the electronic load in favor of the auxiliary battery contact 28a. More particularly, switch means 8 connects the primary battery contact 2a to the (+) supply 4a when the switch means control signal 4b is at a low state. Further, switch means 8 is normally closed which connects the primary battery contact 2a to the (+) supply 4a when there is no switch means control signal 4b present (i.e., when the portable device 10 is out of the holster 20 or the auxiliary battery 28 is in a severe state of discharge). Alternately, when the switch means control signal 4b is at a high state, switch means 8 disconnects the primary battery contact 2a from the (+) supply 4a in favor of auxiliary battery contact 28a. Appropriately driven back-to-back FET circuits and normally closed relays are well known in the art to provide the function of the switch means 8 of the present invention.

Figure 3:
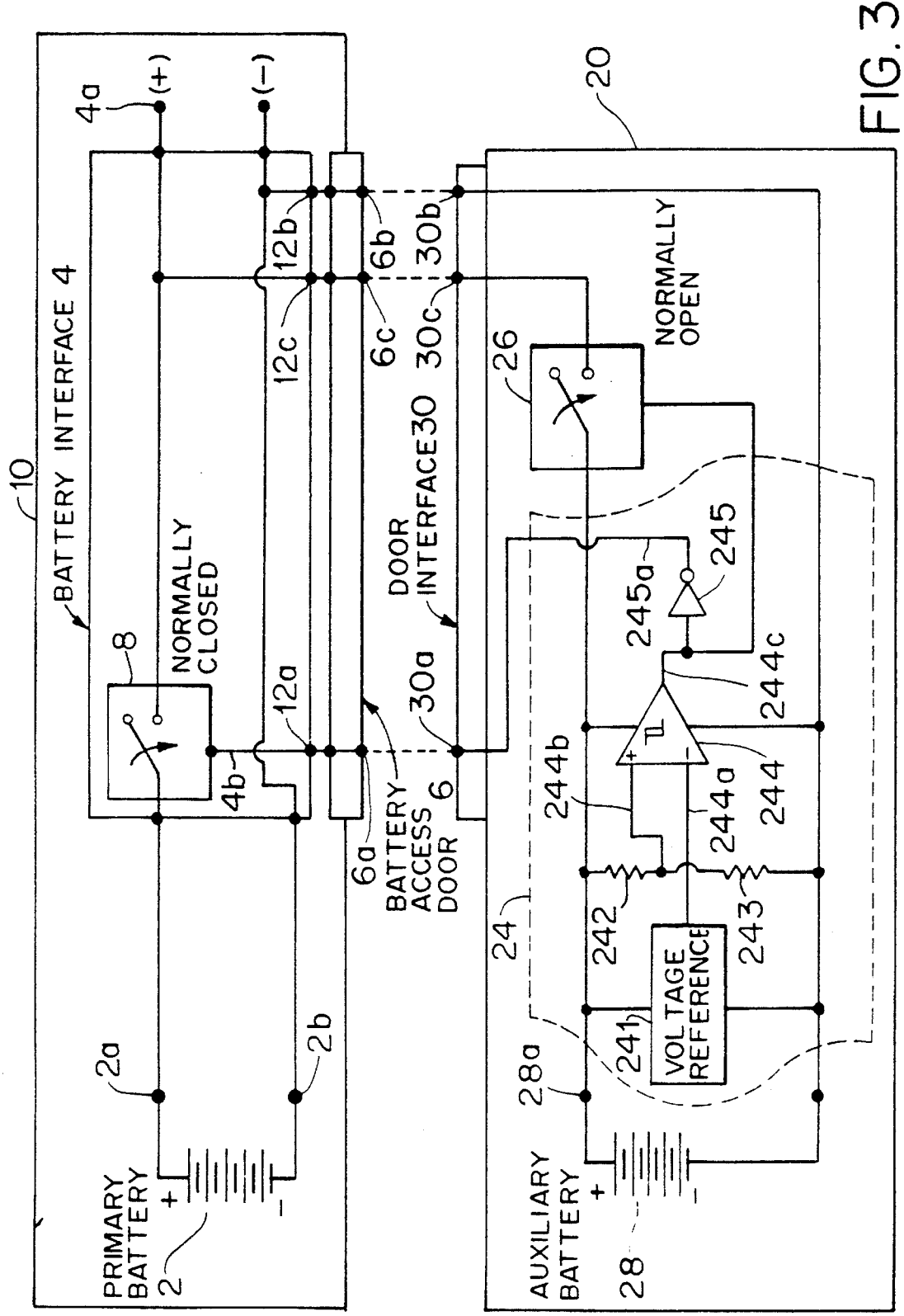
FIG. 3 is a block diagram of the automatic battery control circuit of the present invention.

Reference is now made to FIG. 3 which illustrates the control of switch means 8 and switch means 26 in more detail. Elements of FIG. 3 which are the same as those shown in FIGS. 1 and 2 have the same reference designations. As shown, sense means 24 comprises a voltage reference 241, resistor 242, resistor 243, comparator 244 and inverter 245. Comparator 244 has (−) line 244a, (+) line 244b and output line 244c connected thereto. Inverter 245 has output line 245a connected thereto. The voltage reference 241 supplies the (−) line 244a of the comparator 244 with a fixed, predetermined reference voltage. The voltage divider network, consisting of resistors 242 and 243, is a voltage sensing means which outputs a signal on (+) line 244b which is representative of the terminal voltage of the auxiliary battery 28. When the signal on (+) line 244b is higher than the predetermined reference voltage on (−) line 244a, the signal on output line 244c is high (usually +5 or +15 volts). Alternately, when the signal on (+) line 244b is lower than the predetermined reference voltage on (−) line 244a, the signal on output line 244c is low (usually zero volts). Thus, the comparator 244 outputs a control signal on output line 244c which is responsive to the terminal voltage of the auxiliary battery 28.

In the preferred embodiment of the present invention, switch means 8 is responsive to the control signal on output line 244c via inverter 245 and contacts 30a, 6a and 12a. Specifically, when the signal on output line 244c is high, the signal on output line 245a is low, switch means 8 is open and the primary battery contact 2a is disconnected from the (+) supply line 4a. Alternately, when the signal on output line 244c is low, the signal on output line 245a is high, switch means 8 is closed and the primary battery contact 2a is connected to the (+) supply line 4a. It is noted that comparator 244 may employ a hysteresis circuit which is well known in the art to prevent oscillations on output line 244c when the voltage on lines 244a and 244b approach the same value.

Further, switch means 26 is responsive to the control signal on output line 244c. Specifically, when the signal on output line 244c is high, switch means 26 is closed. Thus, the secondary battery contact 28a is connected to the (+) supply line 4a via contacts 30c, 6c and 12c. Alternately, when the signal on output line 244c is low, switch means 26 is open. When switch means 26 is open, the secondary battery contact 28a is disconnected from the (+) supply line 4a. Therefore, when the secondary battery 28 is fully charged, switch means 26 is closed and the secondary battery 28 supplies power to the portable device 10. Later, when the terminal voltage of the auxiliary battery 28 has fallen below a predetermined level represented by the voltage reference 241, switch means 8 closes, switch means 26 opens and the primary battery 2 supplies power to the portable device 10.

Further, switch means 26 is normally open which disconnects the auxiliary battery contact 28a from the (+) supply 4a when no control signal is present on output line 245a (i.e., when the auxiliary battery 28 is in a severe state of discharge). Appropriately driven back-to-back FET circuits and normally open relays are well known in the art to provide the function of the switch means 26 of the present invention.

Thus, a portable device 10 employing the dual battery control system of the present invention draws power for an extended period of time without the need for manual intervention.

Figure 4:
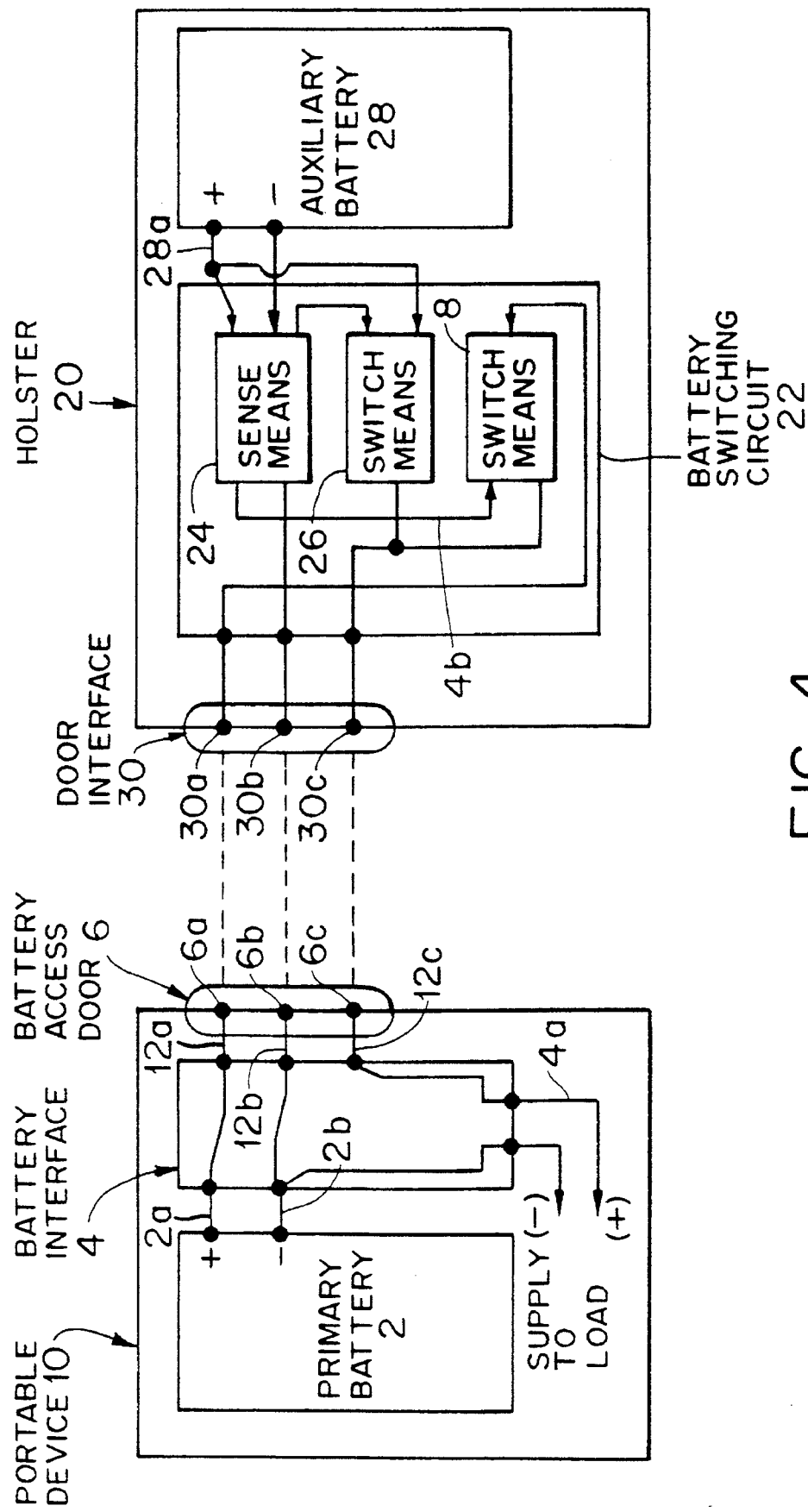
FIG. 4 is a diagram of an alternative embodiment of the automatic battery control system of the present invention.

Reference is now made to FIG. 4 which shows a block diagram of an alternate embodiment of the automatic battery control system of the present invention. Elements of FIG. 4 which are the same as those shown in FIGS. 1 through 3 have the same reference designations. Thus, as shown in FIG. 4, the configurations of the portable device 10 and the holster 20 are generally the same as shown in FIG. 2 except that switch means 8 has been moved to the battery switching circuit 22. Thus, the primary battery contact 2a is input to the switch means 8 via the contacts 12a, 6a and 30a and the switch means control signal 4b need not pass through the battery access door 6 and door interface 30. The operation of this embodiment of the battery switching circuit 22 is exactly the same as described hereinabove and a description is therefore not reproduced.

Figure 5:
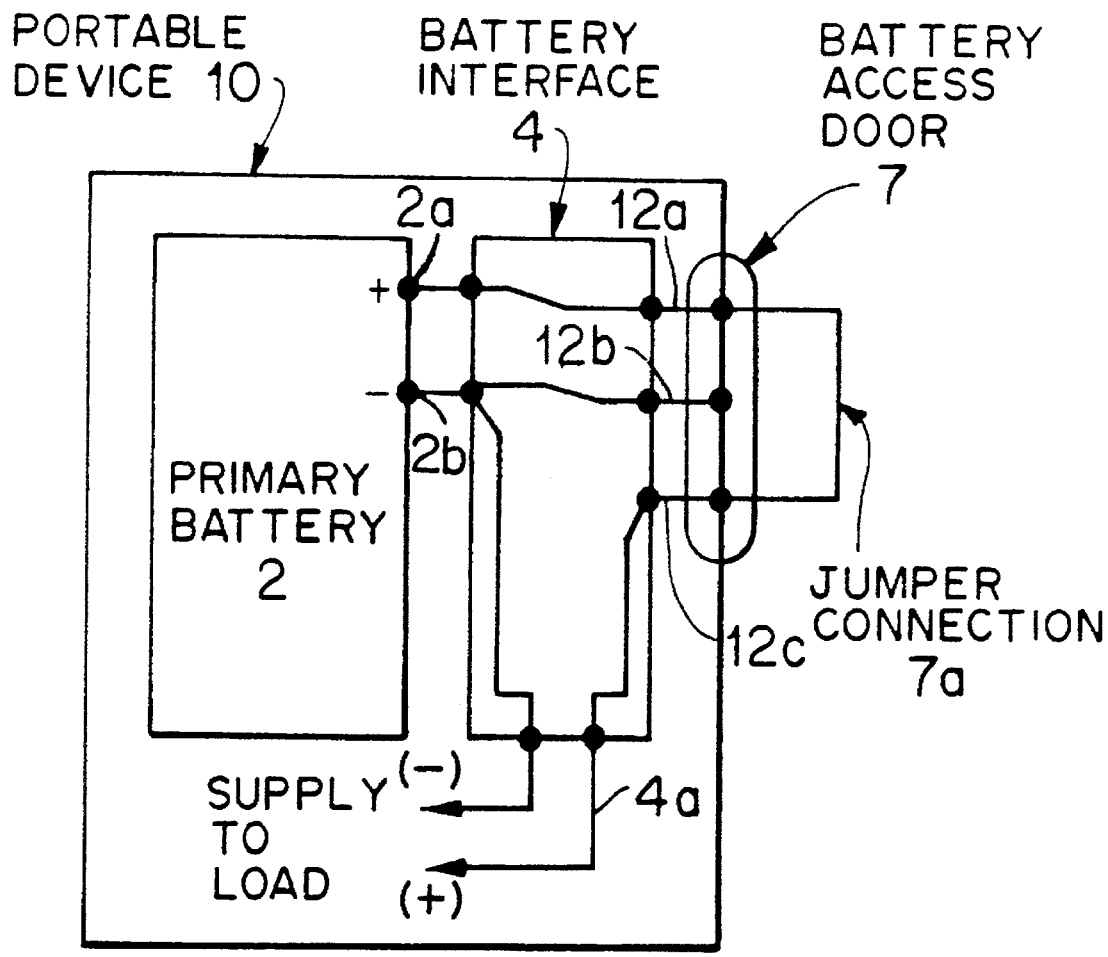
FIG. 5 is a diagram of an alternative embodiment of the portable device of the present invention.

When the portable device 10 shown in FIG. 4 is used without the holster 20, a modification of the battery access door 6 is required. Turning to FIG. 5, a portable device 10 with a modified battery access door 7 is shown. As shown, jumper connection 7a (which is part of the battery access door 7) provides an electrical path for current to flow from the primary battery contact 2a to (+) supply line 4a.

The battery interface 4 of the portable device 10 is generally a removable part both in the prior art and in the preferred embodiment of the present invention. Thus, the battery interface 4 of a prior art device may be removed and replaced or reworked to incorporate the switch means 8 and door contacts 12a, 12b and 12c of the present invention. It is apparent to one skilled in the art that with minor modification to the battery interface 4 and the battery access door of the prior art, the embodiments of the present invention may be retrofit into existing prior art devices.

Thus, in accordance with the teachings of the present invention, the portable device 10 is capable of running for extended periods between charging cycles simply by placing the portable device in a suitably equipped holster 20.

There have been shown and described the preferred embodiments of the present invention. However, it will be appreciated by those skilled in the art that modifications of the embodiments may be made. It is therefore desired that the invention not be limited to these embodiments, and it is intended to cover in the appended claims all the modifications that fall within the true spirit and scope of the invention.

I claim:

1. A portable electronic device and holster means for holding said portable electronic device comprising a dual battery control system comprising:

a first battery having a first low voltage signal and a first high voltage signal, a second battery having a second low voltage signal and a second high voltage signal, a first switch means for connecting and disconnecting said first battery from an electronic load of said portable electronic device in response to a first control signal for changing the state of said first switch means, wherein said first switch means is in a closed state when said portable electronic device is not in said holster, a second switch means for connecting and disconnecting said second battery from said electronic load in response to a second control signal for changing the state of said second switch means, sense means for producing said first and second control signals in response to the terminal voltage of said second battery, and first and second interface means for providing electrical connection between said portable electronic device and said holster means, wherein said portable electronic device contains said first switch means, said first battery, and said first interface means, and wherein said holster means contains said second switch means, said second battery, said sense means and said second interface means, and wherein said first and second interface means each comprise at least three electrical contacts, said at least three electrical contacts of said first interface means operatively connecting with said at least three electrical contacts of said second interface means when said portable electronic device is placed into said holster means, and wherein said first and second interface means enable connection of said first low voltage signal of said first battery to said second low voltage signal of said second battery, and wherein said first and second interface means further enable connection of said second high voltage signal of said second battery, said second high voltage signal emanating from said second switch means when said second switch means is closed, to said electronic load, and wherein said first and second interface means further enable connection of said first control signal emanating from said sense means to said first switch means.

2. The dual battery control system of claim 1 wherein said sense means comprises:

reference means for generating a predetermined reference signal from said second battery;

voltage sensing means for producing a sensed signal representative of the terminal voltage of one of said first and second batteries;

comparison means for generating said second control signal which varies between two states depending on whether said sensed signal is greater than or less than said reference signal; and inverter means which produces said first control signal of an opposite state as said second control signal.

3. The dual battery control system of claim 2 wherein said reference means is a voltage reference.

4. The dual battery control system of claim 2 wherein said comparison means is an analog voltage comparator.

5. The dual battery control system of claim 2 wherein said voltage sensing means is a resistor divider network responsive to the terminal voltage of said second battery.

6. The dual battery control system of claim 1 wherein said first switch means is a normally closed switch which is in a closed state when said first control signal is not connected to said first switch means.

7. The dual battery control system of claim 6 wherein said normally closed switch is taken from the group consisting of an electro-mechanical relay switch and a back-to-back field effect transistor switch.

8. The dual battery control system of claim 1 wherein said second switch means is a normally open switch which is in a open state when said second control signal is not presented to said second switch means.

9. The dual battery control system of claim 8 wherein said normally open switch is taken from the group consisting of an electro-mechanical relay switch and a back-to-back field effect transistor switch.

10. The dual battery control system of claim 1 wherein said portable electronic device further comprises a battery interface means for providing electrical interconnections between said first interface means, said first battery and said electronic load, wherein said battery interface means contains said first switch means thereby providing retrofittable installation of said first switch means into said portable electronic device.

11. The dual battery control system of claim 1 wherein said portable electronic device is a hand held bar-code reader.

* * * * *